(12) United States Patent
Yang

(10) Patent No.: US 12,506,950 B2
(45) Date of Patent: Dec. 23, 2025

(54) PHOTOGRAPHING METHOD, PHOTOGRAPHING APPARATUS, ELECTRONIC DEVICE, AND MEDIUM

(71) Applicant: VIVO MOBILE COMMUNICATION CO., LTD., Dongguan (CN)

(72) Inventor: Qihao Yang, Zhejiang (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 294 days.

(21) Appl. No.: 18/201,400

(22) Filed: May 24, 2023

(65) Prior Publication Data

US 2023/0300450 A1 Sep. 21, 2023

Related U.S. Application Data

(63) Continuation of application No. PCT/CN2021/140760, filed on Dec. 23, 2021.

(30) Foreign Application Priority Data

Dec. 30, 2020 (CN) .......................... 202011603697.3

(51) Int. Cl.
| | |
|---|---|
| *H04N 23/63* | (2023.01) |
| *G06T 7/55* | (2017.01) |
| *G06T 7/70* | (2017.01) |
| *H04N 23/61* | (2023.01) |
| *H04N 23/90* | (2023.01) |

(52) U.S. Cl.
CPC ............. *H04N 23/632* (2023.01); *G06T 7/55* (2017.01); *G06T 7/70* (2017.01); *H04N 23/61* (2023.01); *H04N 23/90* (2023.01); *G06T 2207/20221* (2013.01)

(58) Field of Classification Search
CPC ................................ G06T 7/55; H04N 23/632
See application file for complete search history.

(56) References Cited

U.S. PATENT DOCUMENTS

| | | | |
|---|---|---|---|
| 11,451,706 B2 | 9/2022 | Yang | |
| 12,335,597 B2* | 6/2025 | Lin | ...................... H04N 23/631 |
| 2014/0192245 A1 | 7/2014 | Lee et al. | |
| 2014/0293017 A1 | 10/2014 | Fei et al. | |
| 2015/0237268 A1 | 8/2015 | Vaiaoga et al. | |
| 2019/0222748 A1* | 7/2019 | Weir | ...................... G06F 3/0488 |

(Continued)

FOREIGN PATENT DOCUMENTS

| | | |
|---|---|---|
| CN | 105338238 A | 2/2016 |
| CN | 205562794 U | 9/2016 |
| CN | 107317963 A | 11/2017 |

(Continued)

*Primary Examiner* — Cynthia Segura
(74) *Attorney, Agent, or Firm* — The Webb Law Firm

(57) ABSTRACT

A photographing method includes receiving a first input performed by a user on M control regions of a target control, where the target control includes N control regions, the N control regions include the M control regions. M is a positive integer, and N is a positive integer greater than or equal to M; and displaying M first images on a photographing preview interface in response to the first input, where the M first images are images of a first object that are respectively collected by M cameras, and the M cameras are in a one-to-one correspondence with the M control regions.

11 Claims, 13 Drawing Sheets

(56) References Cited

U.S. PATENT DOCUMENTS

2021/0006712 A1* 1/2021 Kim ................ H04N 21/42204
2022/0159183 A1    5/2022 Li et al.

FOREIGN PATENT DOCUMENTS

| | | | |
|---|---|---|---|
| CN | 107995429 | A | 5/2018 |
| CN | 108174110 | A | 6/2018 |
| CN | 108471498 | A | 8/2018 |
| CN | 108495029 | A | 9/2018 |
| CN | 109862258 | A | 6/2019 |
| CN | 110505400 | A | 11/2019 |
| CN | 110505411 | A | 11/2019 |
| CN | 110971832 | A | 4/2020 |
| CN | 111010508 | A | 4/2020 |
| CN | 111010512 | A | 4/2020 |
| CN | 112738403 | A | 4/2021 |
| WO | 2017016030 | A1 | 2/2017 |
| WO | 2020186969 | A1 | 9/2020 |

* cited by examiner

PHOTOGRAPHING METHOD, PHOTOGRAPHING APPARATUS, ELECTRONIC DEVICE, AND MEDIUM

CROSS-REFERENCE TO RELATED APPLICATIONS

This application is a Bypass Continuation Application of PCT/CN2021/140760, filed Dec. 23, 2021, and claims priority to Chinese Patent Application No. 202011603697.3, filed Dec. 30, 2020, the disclosures of which are hereby incorporated by reference in their entireties.

BACKGROUND OF THE INVENTION

Field of the Invention

This application pertains to the field of photographing technologies, and relates to a photographing method, a photographing apparatus, an electronic device, and a medium.

Description of Related Art

With the popularity of electronic devices, people are more and more accustomed to recording life by using electronic devices, and pictures taken by using electronic devices are increasingly favored by users. In the prior art, after a user takes a picture by using an electronic device, the taken picture usually needs to be edited later by using professional editing software to obtain a picture with desired effect. Consequently, later editing is difficult and operations are cumbersome.

SUMMARY OF THE INVENTION

Embodiments of this application provide a photographing method, a photographing apparatus, an electronic device, and a medium.

According to a first aspect, an embodiment of this application provides a photographing method, including:
  receiving a first input performed by a user on M control regions of a target control, where the target control includes N control regions, the N control regions include the M control regions, M is a positive integer, and N is a positive integer greater than or equal to M; and
  displaying M first images on a photographing preview interface in response to the first input, where the M first images are images of a first object that are respectively collected by M cameras, and the M cameras are in a one-to-one correspondence with the M control regions.

According to a second aspect, an embodiment of this application provides a photographing apparatus, including:
  a first receiving module, configured to receive a first input performed by a user on M control regions of a target control, where the target control includes N control regions, the N control regions include the M control regions, M is a positive integer, and N is a positive integer greater than or equal to M; and
  a first display module, configured to display M first images on a photographing preview interface in response to the first input, where the M first images are images of a first object that are respectively collected by M cameras, and the M cameras are in a one-to-one correspondence with the M control regions.

According to a third aspect, an embodiment of this application provides an electronic device. The electronic device includes a processor, a memory, and a program or an instruction stored in the memory and executable on the processor, where when the program or the instruction is executed by the processor, the steps of the method in the first aspect are implemented.

According to a fourth aspect, an embodiment of this application provides a non-transitory readable storage medium. The non-transitory readable storage medium stores a program or an instruction, and when the program or the instruction is executed by a processor, the steps of the method in the first aspect are implemented.

According to a fifth aspect, an embodiment of this application provides a chip. The chip includes a processor and a communications interface, the communications interface is coupled to the processor, and the processor is configured to run a program or an instruction to implement the method in the first aspect.

According to a sixth aspect, an embodiment of this application provides a computer program product. The computer program product is stored in a readable storage medium, and the computer program product is executed by at least one processor to implement the method in the first aspect.

DESCRIPTION OF THE INVENTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the specification and claims of this application, the terms "first", "second", and the like are intended to distinguish between similar objects but do not describe a specific order or sequence. It should be understood that, the terms used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in the specification and the claims, "and/or" represents at least one of connected objects, and a character "/" generally represents an "or" relationship between associated objects.

With reference to the accompanying drawings, a photographing method provided in the embodiments of this application is described in detail by using embodiments and application scenarios.

Figure 1:
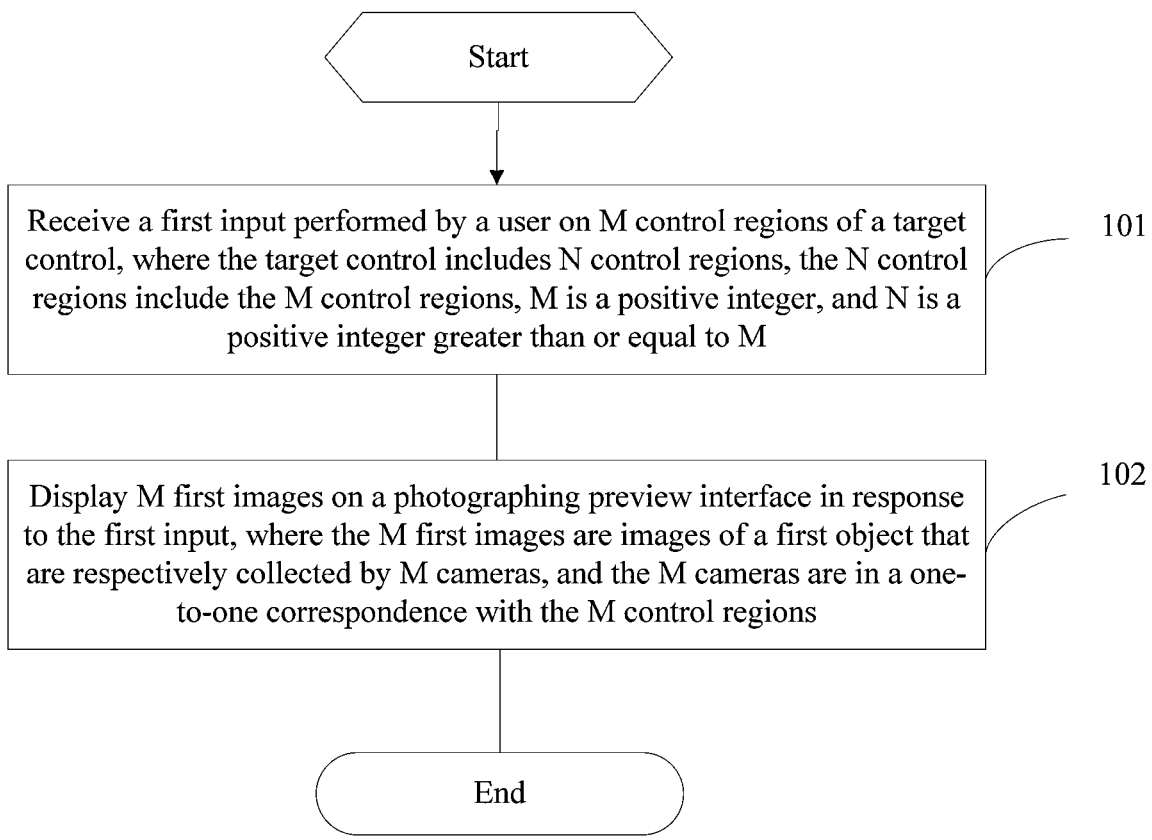
FIG. 1 is a flowchart of a photographing method according to an embodiment of this application.

As shown in FIG. 1, an embodiment of this application provides a photographing method, including:

Step 101: receive a first input performed by a user on M control regions of a target control, where the target control includes N control regions, the N control regions include the M control regions, M is a positive integer, and N is a positive integer greater than or equal to M.

In this embodiment of this application, the N control regions may be disposed at intervals between two or at least partially connected. The N control regions may respectively correspond to N cameras. The N cameras may be some of cameras provided by a multi-camera electronic device, or may be all of cameras provided by a multi-camera electronic device. For example, if the multi-camera electronic device includes nine cameras, the N cameras may be the nine cameras, or may be some of the nine cameras.

The first input may be a tap input, for example, touch inputs or operations of various types such as a single-tap input or a double-tap input, a sliding input, a circle input, or a long-press input, or may be a sound input.

In this embodiment of this application, optionally, before step 101, the method may further include: receiving a sixth input on a photographing control on a photographing preview interface, and displaying the target control on the photographing preview interface in response to the sixth input. Herein, the photographing preview interface may be an interface used by the user to preview an effect of a to-be-generated image. The photographing control may also be referred to as a photographing button. The sixth input may be a tap input, for example, touch inputs or operations of various types such as a single-tap input or a double-tap input, a sliding input, a circle input, or a long-press input, or may be a sound input.

Step 102: display M first images on a photographing preview interface in response to the first input, where the M first images are images of a first object that are respectively collected by M cameras, and the M cameras are in a one-to-one correspondence with the M control regions.

In this embodiment of this application, the first object may be an object corresponding to any image displayed on the photographing preview interface. For example, when an image of a star, an image of a rocket, and an image of a tree are displayed on the photographing preview interface, the first object may be any one of the stars, the rocket, and the tree.

The first object may be an object automatically selected according to a preset rule, or may be an object selected according to an input of the user.

In a case that the first object is the object selected according to the input of the user, optionally, before step 102, the method may further include: receiving a seventh input for selecting a target to-be-selected image on the photographing preview interface, and determining, in response to the seventh input, an object corresponding to the target to-be-selected image as the first object. Herein, the seventh input may be a tap input, for example, touch inputs or operations of various types such as a single-tap input or a double-tap input, a sliding input, a circle input, or a long-press input, or may be a sound input.

Figure 2:
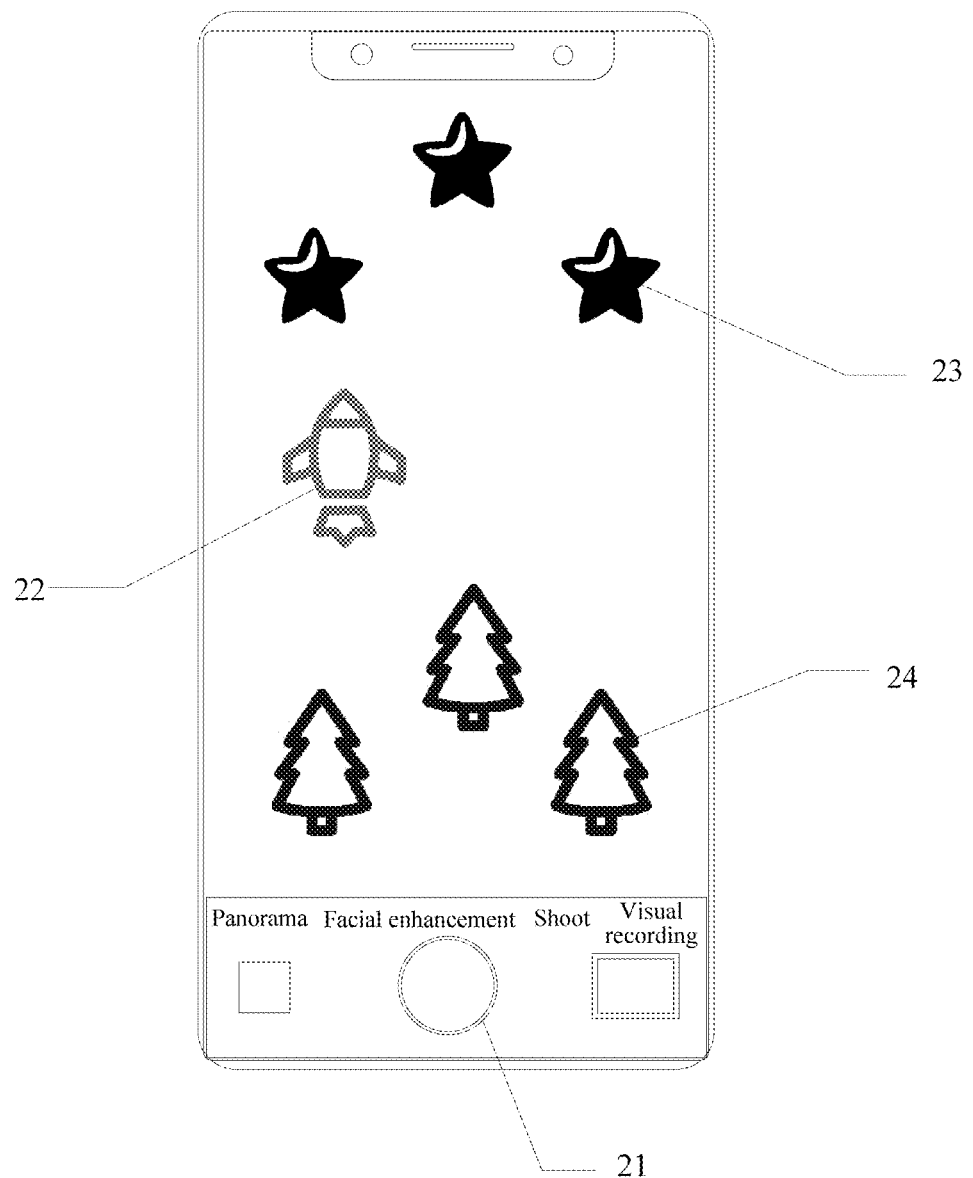
FIG. 2 is a first interface diagram of a photographing preview interface in a photographing method according to an embodiment of this application.
Figure 3:
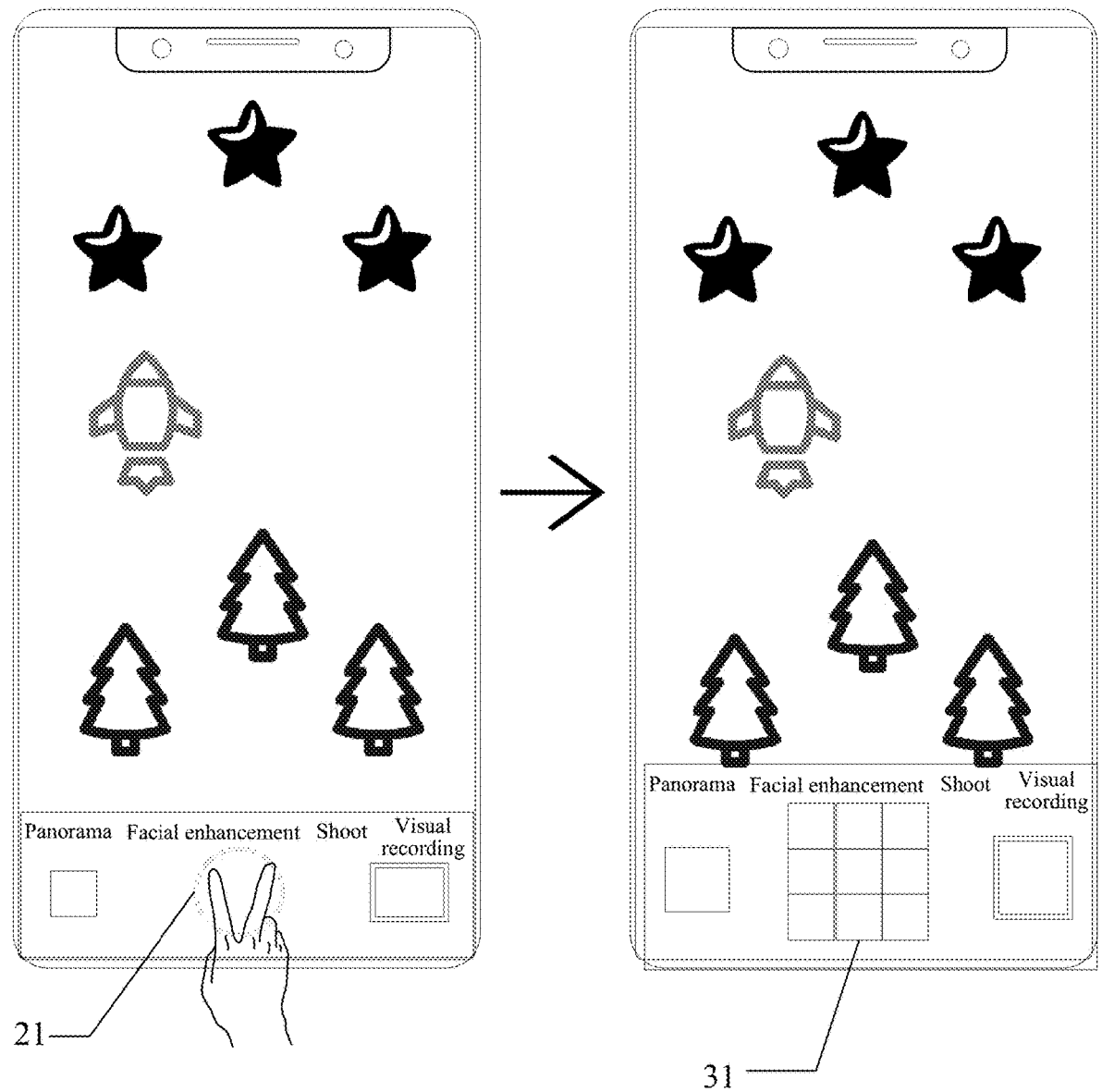
FIG. 3 is a second interface diagram of a photographing preview interface in a photographing method according to an embodiment of this application.

The photographing method provided in this embodiment of this application may be applied to a photographing scenario in which the user needs to take an image with desired effect, for example, a hierarchical image needs to be taken, and later editing is not required by using later editing software or professional software. For ease of understanding, for example, it is assumed that the electronic device includes nine cameras. The photographing preview interface displayed by the electronic device when the user opens the cameras is shown in FIG. 2. The photographing preview interface includes a photographing button 21, an image 22 of a rocket, an image 23 of a star, and an image 24 of a tree, where N is 9, and M is 3. A process in which the user obtains a hierarchical image may be as follows:

Step 1: as shown in FIG. 3, the user quickly taps the photographing button 21 by using two fingers to invoke a target control 31, where the target control 31 includes nine control regions. A 3×3 pattern shown on the right side in FIG. 3 represents the nine control regions, a display region of each grid of the 3×3 pattern represents one control region, and the nine control regions are in a one-to-one correspondence with the nine cameras of the electronic device.

Figure 4:
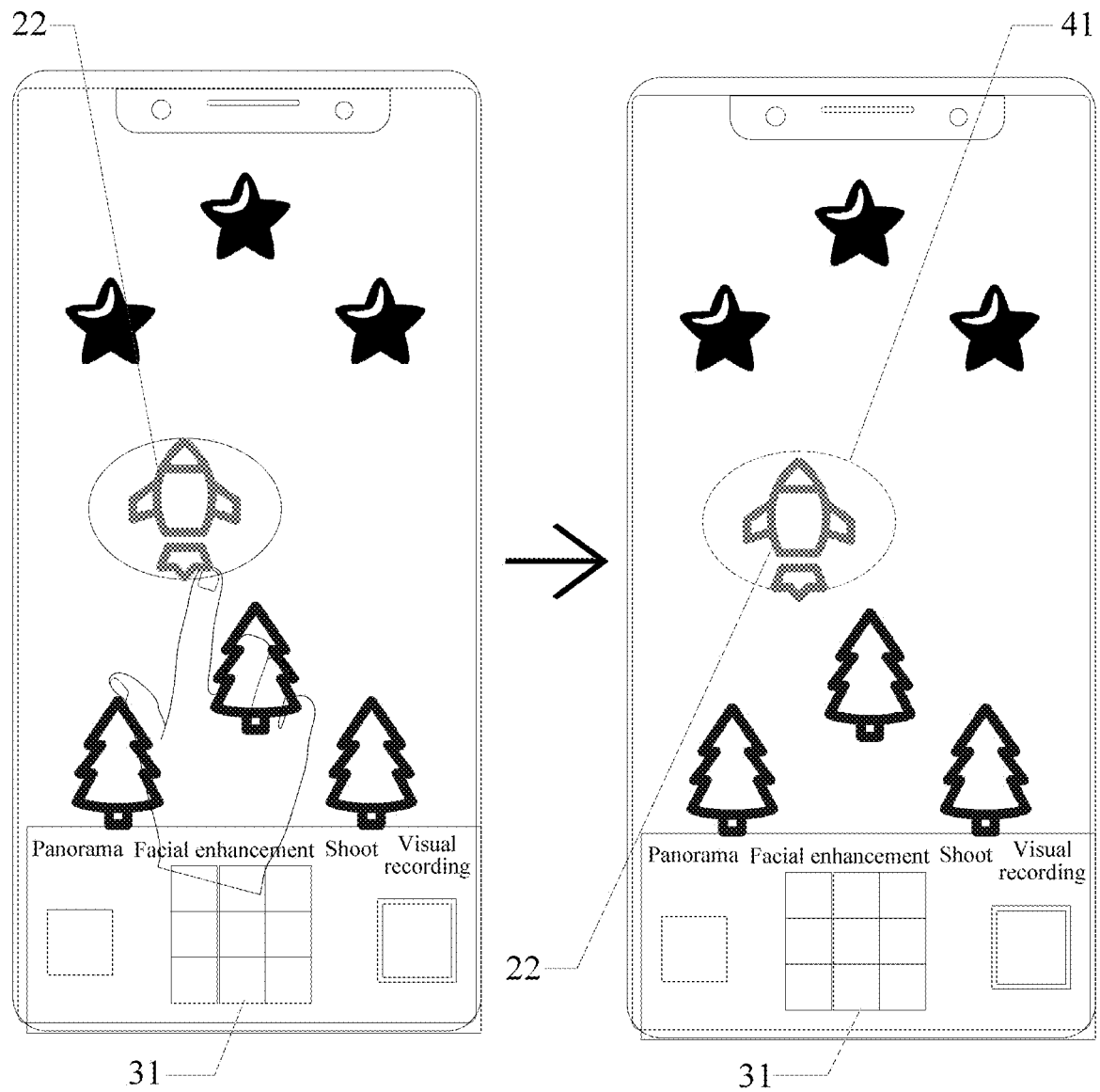
FIG. 4 is a third interface diagram of a photographing preview interface in a photographing method according to an embodiment of this application.

Step 2: as shown in FIG. 4, the user performs sliding around the image 22 of the rocket by using a touch apparatus such as a finger or a stylus, and a sliding track is a circle, so that a photographed object corresponding to the image 22 of the rocket, that is, the rocket, is selected as a subject of multiple photographing. After releasing a hand, a dotted box 41 that circles the image 22 of the rocket is additionally displayed on the photographing preview interface, to notify the user that the photographed object corresponding to the image 22 of the rocket is selected.

Step 3: the user performs sliding on the display region of the 3×3 pattern, that is, the target control 31 by using a touch apparatus such as a finger or a stylus, and a sliding track passes through any three control regions in the target control 31 successively. In this case, an image of the rocket collected by a camera corresponding to each of the three control regions through which the sliding track passes is added to the photographing preview interface. That is, in this case, three images of the rocket are displayed on the photographing preview interface, and the three images of the rocket are images of the rocket separately collected by three cameras corresponding to the three control regions through which the sliding track passes.

Step 4: the user taps a control region in the middle of the target control 31 to complete photographing, to obtain a hierarchical image.

In this embodiment of this application, a first input performed by a user on M control regions of a target control is received, where the target control includes N control regions, the N control regions include the M control regions, M is a positive integer, and N is a positive integer greater than or equal to M; and M first images are displayed on a photographing preview interface in response to the first input, where the M first images are images of a first object that are respectively collected by M cameras, and the M cameras are in a one-to-one correspondence with the M control regions. In this way, an image that is of an object collected by each camera in all cameras and that is selected by a user can be added to a photographing preview interface, so that the user can obtain a hierarchical image by operating a target control in a photographing phase without performing later editing by using professional editing software after image photographing. Therefore, photographing of an image that meets a desired effect of the user can be simplified. In addition, the user can flexibly use each camera, thereby meeting photographing requirements of different users for different photographing effects.

Optionally, a relative location between the M first images is determined according to a relative location between the M control regions.

In this embodiment of this application, that a relative location between the M first images is determined according to a relative location between the M control regions may be: in a case that the first input matches a first preset input, the relative location between the M first images is determined according to the relative location between the M control regions.

That a relative location between the M first images is determined according to a relative location between the M control regions may be that a relative azimuth between the M first images is the same as a relative azimuth between the M control regions, and a relative distance between the M first images is also the same as a relative distance between the M control regions, or may be that a relative azimuth between the M first images is the same as a relative azimuth between the M control regions, but a relative distance between the M first images is different from a relative distance between the M control regions.

Figure 5:
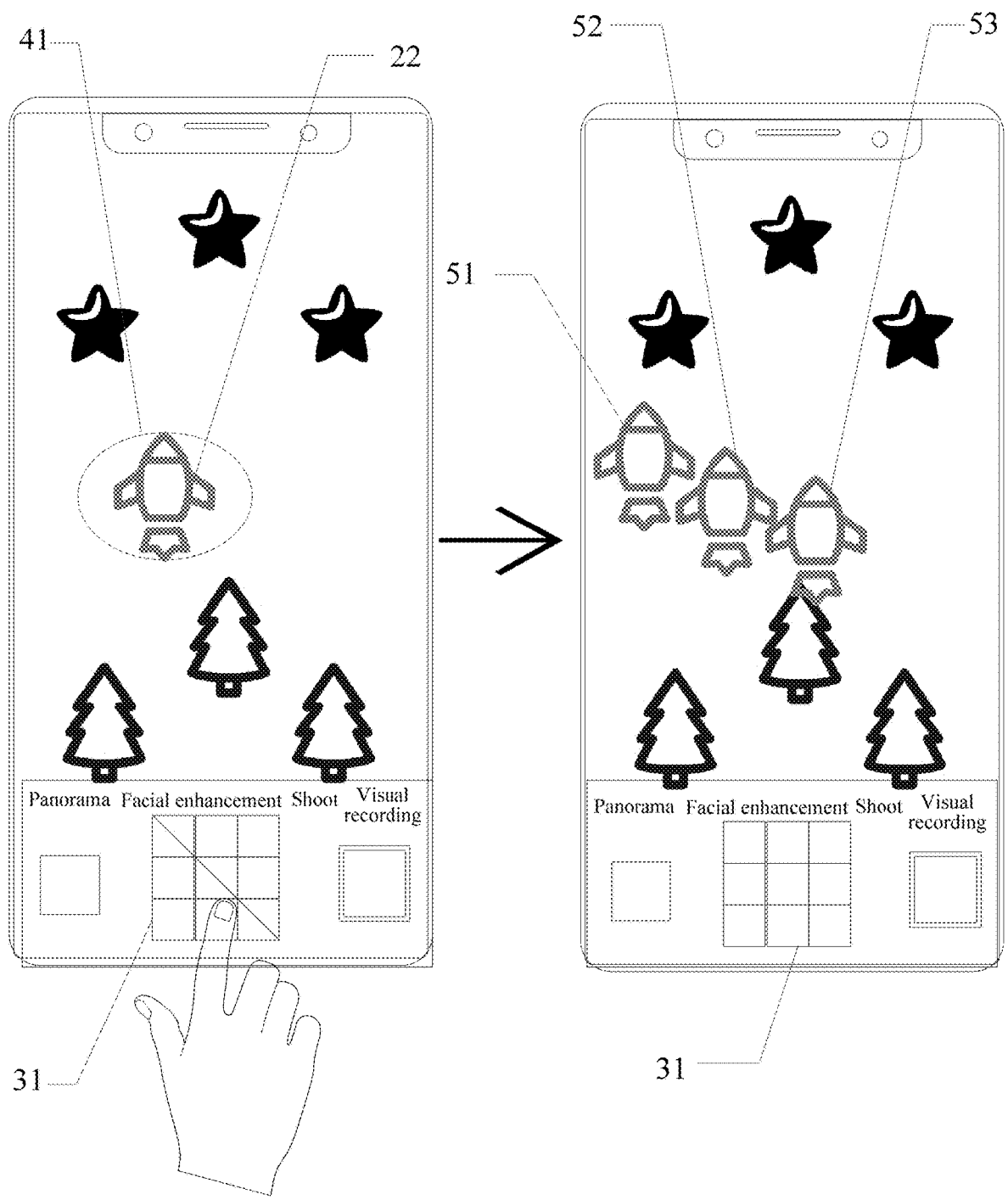
FIG. 5 is a fourth interface diagram of a photographing preview interface in a photographing method according to an embodiment of this application.

For ease of understanding, the foregoing examples, that is, the examples corresponding to FIG. 2 to FIG. 4, are described herein. It is assumed that in step 3 of the foregoing example, a schematic diagram in which the user performs sliding on the display region of the 3×3 pattern, that is, the target control 31 by using a touch apparatus such as a finger or a stylus is shown on the left side in FIG. 5. That is, the three control regions through which the sliding track passes are respectively a control region in an upper left corner of the target control 31, that is, a display region of an upper-left grid in a 3×3 pattern shown on the left side in FIG. 5, a control region in the middle, that is, a display region of a middle grid in the 3×3 pattern shown on the left side in FIG. 5, and a control region in a lower right corner, that is, a display region of a lower-right grid in the 3×3 pattern shown on the left side in FIG. 5. As shown on the right side in FIG. 5, a relative location between three images 51 to 53 of the rocket displayed on the photographing preview interface is the same as a relative location between the three control regions through which the sliding track passes. That is, on the photographing preview interface, one image 51 of the rocket is displayed in the upper left corner, one image 53 of the rocket is displayed in the lower right corner, and one image 52 of the rocket is displayed in the middle.

Because the relative location between the M first images is determined according to the relative location between the M control regions, when the user needs to arrange the M first images according to a specific relative location, the M control regions at corresponding locations may be selected when the user selects the control regions, so that operations are convenient and an implementation speed is faster. Therefore, photographing of an image that meets a desired effect of the user can be simplified. In addition, the user can flexibly use each camera, thereby meeting photographing requirements of different users for different photographing effects.

Optionally, display areas of all of the M first images are different from each other, and the M first images are successively superposed and displayed.

In this embodiment of this application, that display areas of all of the M first images are different from each other, and the M first images are successively superposed and displayed may be: in a case that the first input matches a second preset input, the display areas of all of the M first images are different from each other, and the M first images are successively superposed and displayed.

That the M first images are successively superposed and displayed may be that the M first images are successively stacked and displayed. Optionally, a first image with a largest display area may be displayed at the bottom layer, and a first image with a smallest display area may be displayed at the top layer. For the rest of the first images, the larger a display area, the closer to the bottom layer, and the smaller a display area, the closer to the top layer.

For ease of understanding, the foregoing examples, that is, the examples corresponding to FIG. 2 to FIG. 4, are still described herein. It is assumed that in step 3 of the foregoing example, a schematic diagram in which the user performs sliding on the display region of the 3×3 pattern, that is, the display region on the target control 31 by using a touch apparatus such as a finger or a stylus is shown on the left side in FIG. 6. That is, the three control regions through which the sliding track passes are respectively a control region in an upper left corner of the target control 31, that is, a display region of an upper-left grid in a 3×3 pattern shown on the left side in FIG. 6, a control region in the middle, that is, a display region of a middle grid in the 3×3 pattern shown on the left side in FIG. 6, and a control region in a lower right corner, that is, a display region of a lower-right grid in the 3×3 pattern shown on the left side in FIG. 6, and the sliding track passes through the control region in the lower right corner and then through the control region in the middle. As shown on the right side in FIG. 6, display areas of three images 61 to 63 of the rocket displayed on the photographing preview interface are different from each other, and the three images 61 to 63 of the rocket are successively superposed and displayed.

Because the display areas of all of the M first images are different from each other, and the M first images are successively superposed and displayed, the M first images can be successively superposed and displayed on the photographing preview interface, so that hierarchical images that have different superposition effects can be obtained through photographing. Therefore, photographing of an image that meets a desired effect of the user can be simplified. In addition, the user can flexibly use each camera, thereby meeting photographing requirements of different users for different photographing effects.

Optionally, the first input is an input used for successively selecting the M control regions; and
 a superposition order of each first image in the M first images is determined according to a selected order of a control region corresponding to each first image, and a display area of each first image in the M first images is determined according to the selected order of the control region corresponding to each first image.

In this embodiment of this application, that a superposition order of each first image in the M first images is determined according to a selected order of a control region corresponding to each first image may be: a first image corresponding to a control region that selected later is superposed on a first image corresponding to a control region that is selected earlier for display. For example, assuming that the first input is an input of successively selecting a control region A, a control region B, and a control region C, a first image corresponding to the control region B is superposed on a first image corresponding to the control region A that is first selected, and a first image corresponding to the control region C that is last selected is superposed on a first image corresponding to the control region B. Certainly, that a superposition order of each first image in the M first images is determined according to a selected order of a control region corresponding to each first image may be: a first image corresponding to a control region that is selected earlier is superposed on a first image corresponding to a control region that is selected later for display. For example, assuming that the first input is an input of successively selecting a control region A, a control region B, and a control region C, a first image corresponding to the control region B is superposed on a first image corresponding to the control region C that is last selected, and a first image corresponding to the control region A that is first selected is superposed on a first image corresponding to the control region B.

That a display area of each first image in the M first images is determined according to the selected order of the control region corresponding to each first image may be: a display area of a first image corresponding to a control region that is selected later is greater than a display area of a first image corresponding to a control region that is selected earlier. For example, if the first input is an input of successively selecting a control region A, a control region B, and a control region C, a display area of a first image corresponding to the control region B is greater than a display area of a first image corresponding to the control region A that is first selected, and the display area of the first image corresponding to the control region B is less than a display area of a first image corresponding to the control region C that is last selected. Certainly, that a display area of each first image in the M first images is determined according to the selected order of the control region corresponding to each first image may be: a display area of a first image corresponding to a control region that is selected later is less than a display area of a first image corresponding to a control region that is selected earlier. For example, if the first input is an input of successively selecting a control region A, a control region B, and a control region C, a display area of a first image corresponding to the control region B is less than a display area of a first image corresponding to the control region A that is first selected, and the display area of the first image corresponding to the control region B is greater than a display area of a first image corresponding to the control region C that is last selected.

Figure 6:
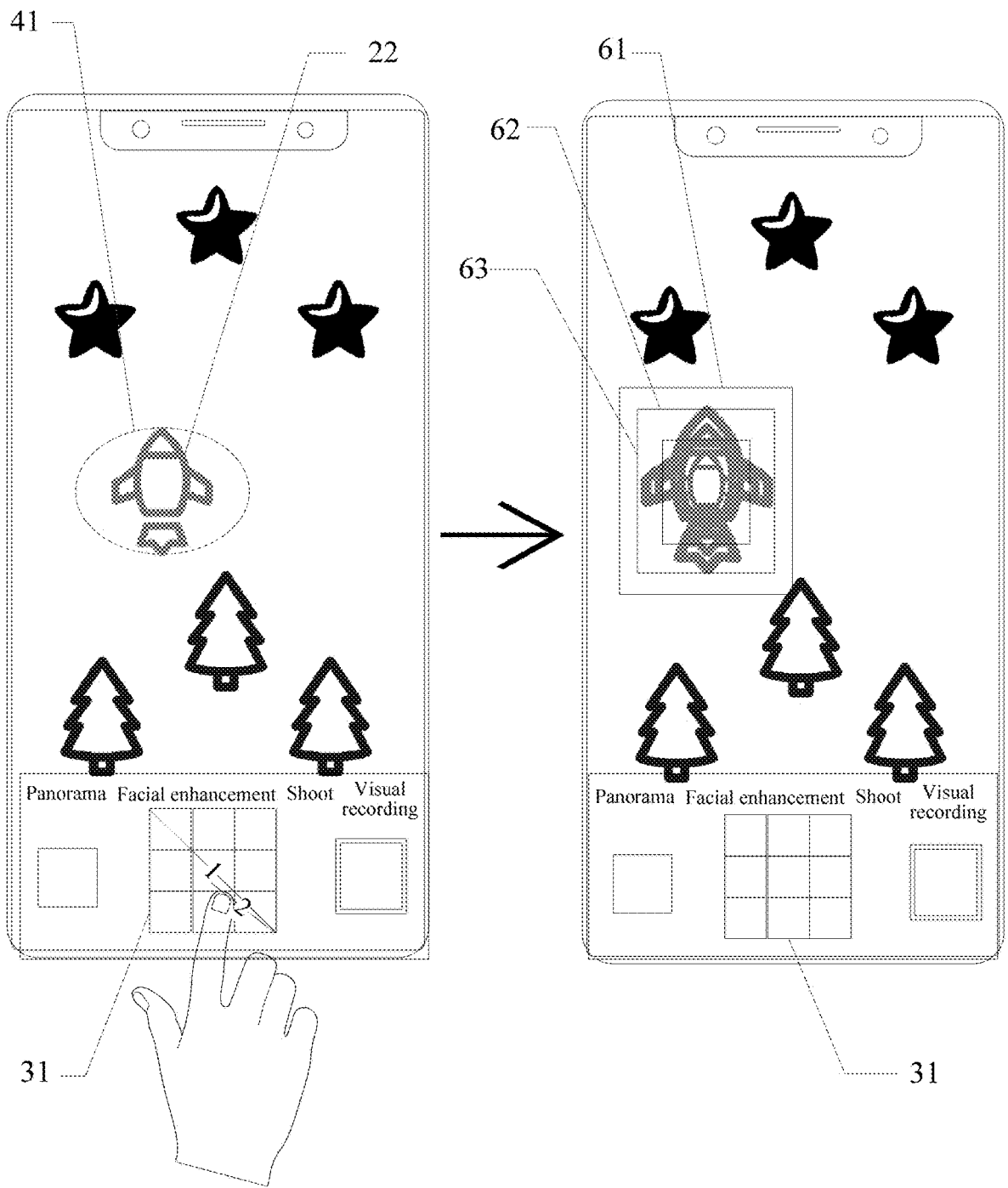
FIG. 6 is a fifth interface diagram of a photographing preview interface in a photographing method according to an embodiment of this application.

For ease of understanding, details are still described herein based on the example in the previous implementation, that is, the example corresponding to FIG. 6. For example, in the previous implementation, that display areas of the three images 61 to 63 of the rocket displayed on the photographing preview interface are different from each other and successively superposed and displayed may be: a display area of the image 61 corresponding to the control region in the upper left corner is the largest and displayed at the bottom layer, a display area of the image 63 corresponding to the control region in the lower right corner is the smallest and displayed at the top layer, and a display area of the image 62 corresponding to the control region in the middle is less than the display area of the image 61 and is greater than the display area of the image 63 and displayed at the middle layer.

The first input is an input used for successively selecting the M control regions, the superposition order of each first image in the M first images is determined according to the selected order of the control region corresponding to each first image, and the display area of each first image in the M first images is determined according to the selected order of the control region corresponding to each first image, so that the user can flexibly and conveniently adjust, by controlling selected orders of the M control regions, superposition orders and display areas of the M first images added to the photographing preview interface. Therefore, photographing of an image that meets a desired effect of the user can be simplified. In addition, the user can flexibly use each camera, thereby meeting photographing requirements of different users for different photographing effects.

Optionally, after the displaying M first images on a photographing preview interface in response to the first input, the method further includes:
 receiving a sliding input performed by the user on the target control;
 in a case that a sliding direction of the sliding input is a first direction, displaying, on the photographing preview interface, an image that is of the first object and that is collected by a first camera, where the first camera is any camera in the N cameras except the M cameras, and the N cameras are in a one-to-one correspondence with the N control regions;
 in a case that the sliding direction of the sliding input is a second direction, cancelling display, on the photographing preview interface, of an image that is of the first object and that is collected by a second camera, where the second camera is any camera in the M cameras; and
 in a case that the sliding direction of the sliding input is a third direction, undoing a first operation, where a first execution moment of the first operation is earlier than a second execution moment of the sliding input.

In this embodiment of this application, the receiving a sliding input on the target control may be receiving a sliding input on a target control region in the target control. Herein, the target control region may be any control region in the target control, such as an intermediate control region or an edge control region.

When the relative location between the M first images is determined according to the relative location between the M control regions, a display location of the image that is of the first object and that is collected by the first camera may be determined according to a relative location between a control region corresponding to the first camera and the M control regions.

When the display areas of all of the M first images are different from each other, and the M first images are successively superposed and displayed, the image that is of the first object and that is collected by the first camera may be superposed to be displayed above the M first images or below the M first images, and a display area of the image that is of the first object and that is collected by the first camera may be different from a display area of any first image in the M first images.

The undoing a first operation may be undoing an operation of displaying the M first images on the photographing preview interface.

For ease of understanding, an example is given herein for illustration.

It is assumed that in step 3 of the foregoing example corresponding to FIG. 2 to FIG. 4, after the user performs sliding on the display region of the 3×3 pattern, that is, the display region in the target control 31 by using a touch apparatus such as a finger or a stylus, the photographing preview interface is shown on the right side in FIG. 6, that is, display areas of three displayed images 61 to 63 of the rocket are different from each other, and the three images 61 to 63 of the rocket are successively superposed and displayed. Before step 4 of the foregoing example after step 3, as shown on the left side in FIG. 7, if the user performs sliding on any control region of the target control 31, that is, a display region of any grid of the 3×3 pattern shown on the left side in FIG. 7 by using a touch apparatus such as a finger or a stylus, and a sliding direction is upward, as shown on the right side in FIG. 7, one image 71 of the rocket is superposed on the three images 61 to 63 of the rocket that are superposed and displayed on the photographing preview interface and is displayed, and the image 71 of the rocket is an image of the rocket collected by a camera corresponding to a target control region except a control region in the upper left corner, a control region in the middle, and a control region in the lower right corner, where the target control region is a display region in a grid in the 3×3 pattern on the left side in FIG. 7 except an upper-left grid, a middle grid, and a lower-right grid. For example, when sliding in the upward sliding direction is performed on the control region in the middle, that is, a display region of the middle grid in the 3×3 pattern shown on the left side in FIG. 7, the target control region may be a control region closest to the control region in the middle except the control region in the upper left corner, the control region in the middle, and the control region in the lower right corner, that is, the target control region may be a display region of a grid closet to the middle grid in the 3×3 pattern shown on the left side in FIG. 7 except the upper-left grid, the middle grid, and the lower-right grid, and a display area of the image 71 of the rocket collected by the camera corresponding to the target control region may be less than a display area of any image of the rocket in the three images 61 to 63 of the rocket. When sliding in the upward sliding direction is performed on a display region except the control region in the middle, that is, a display region of a grid in the 3×3 pattern shown on the left side in FIG. 7 except the middle grid, the target control region may be a control region closest to the control region on which sliding in the upward sliding direction is performed except the control region in the upper left corner, the control region in the middle, and the control region in the lower right corner, that is, the target control region is a control region of a grid closest to a grid on which sliding in the upward sliding direction is performed in the in the 3×3 pattern shown on the left side in FIG. 7 except the upper-left grid, the middle grid, and the lower-right grid, and a display area of the image 71 of the rocket collected by the camera corresponding to the target control region may be greater than a display area of any image of the rocket in the three images 61 to 63 of the rocket.

Figure 7:
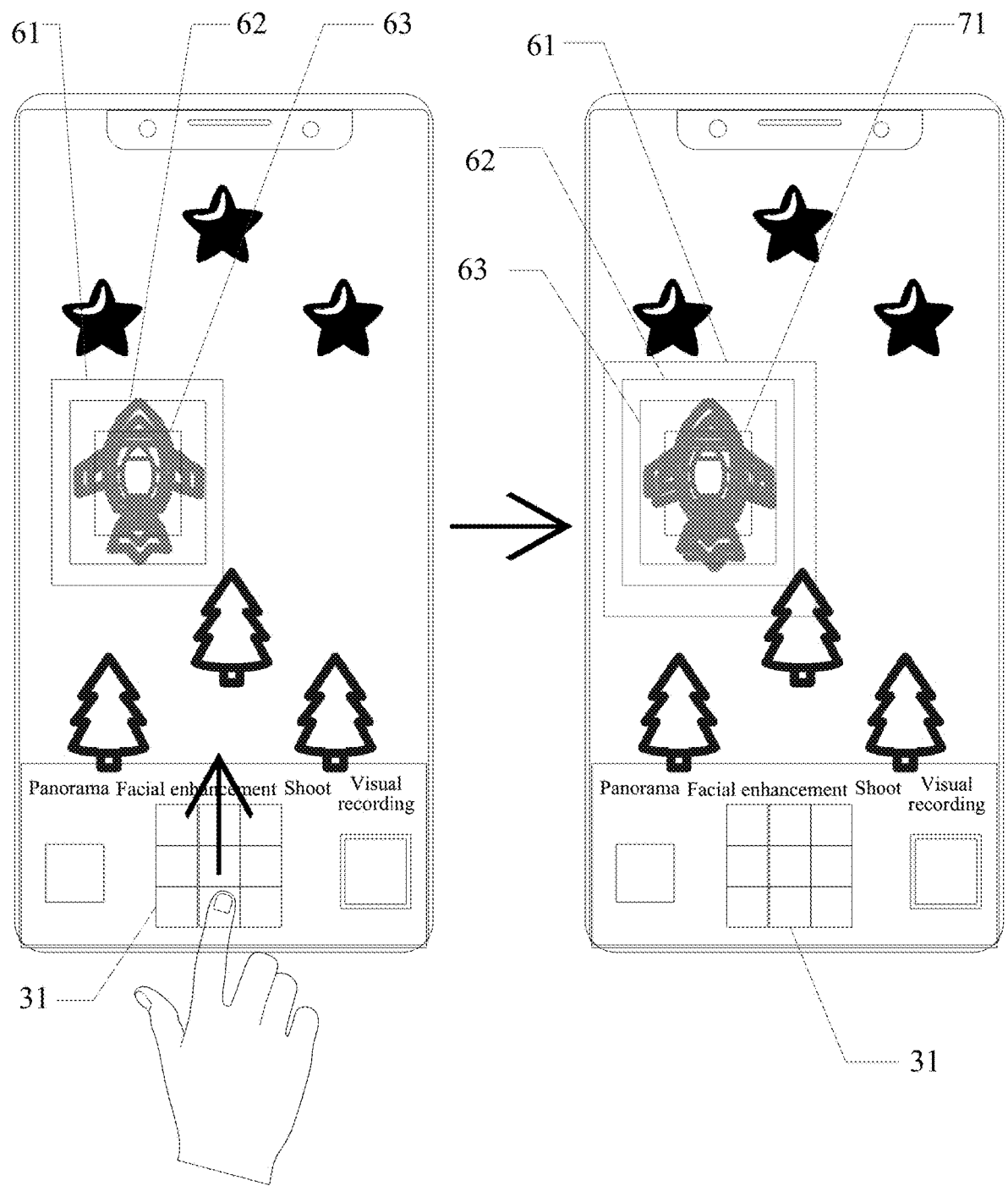
FIG. 7 is a sixth interface diagram of a photographing preview interface in a photographing method according to an embodiment of this application.
Figure 8:
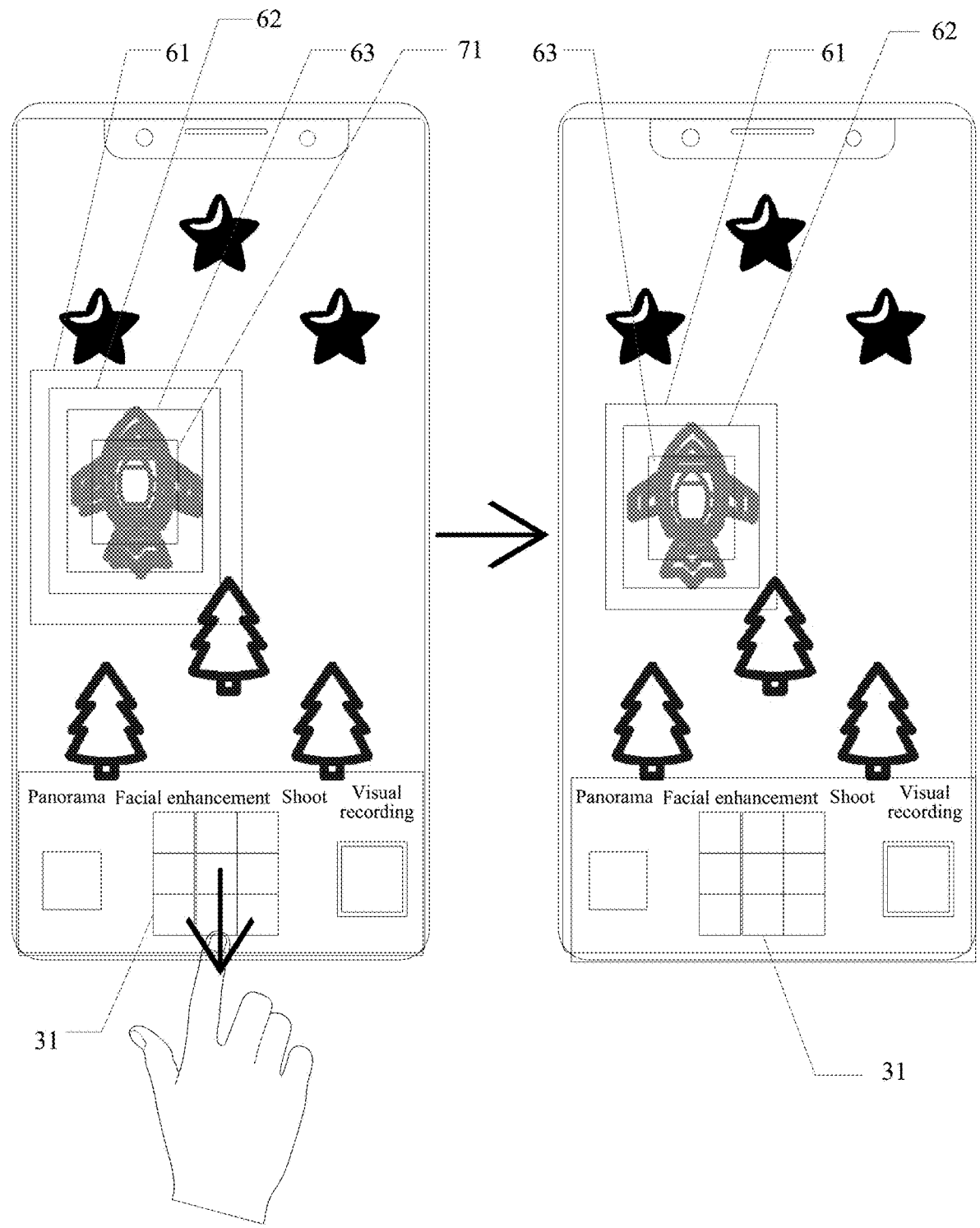
FIG. 8 is a seventh interface diagram of a photographing preview interface in a photographing method according to an embodiment of this application.

Then, as shown on the left side in FIG. 8, it is assumed that the user performs sliding on any control region of the target control 31 on the photographing preview interface shown on the right side in FIG. 7, that is, a display region of any grid in a 3×3 pattern shown on the left side in FIG. 8 by using a touch apparatus such as a finger or a stylus, and a sliding direction is downward. As shown on the right side in FIG. 8, display, on the photographing preview interface, of an image of the rocket collected by a camera corresponding to one of a control region in an upper left corner, that is, a display region of an upper-left grid in the 3×3 pattern shown on the left side in FIG. 8, a control region in the middle, that is, a display region of a middle grid in the 3×3 pattern shown on the left side in FIG. 8, a control region in a lower right corner, that is, a display region of a lower-right grid in the 3×3 pattern shown on the left side in FIG. 8, and the target control region is cancelled. That is, one of the four images 61, 62, 63, and 71 of the rocket that are superposed and displayed on the photographing preview interface is no longer displayed on the photographing preview interface. Optionally, when sliding in the downward sliding direction is performed on the control region in the middle, that is, the display region of the middle grid in the 3×3 pattern shown on the left side in FIG. 8, an image that is of the rocket and whose display is cancelled may be an image with a smallest display area in the four images of the rocket. When sliding in the downward sliding direction is performed on a control region except the control region in the middle, that is, a display region of a grid in the 3×3 pattern shown on the left side in FIG. 8 except the middle grid, an image that is of the rocket and whose display is cancelled may be an image with a largest display area in the four images of the rocket.

Figure 9:
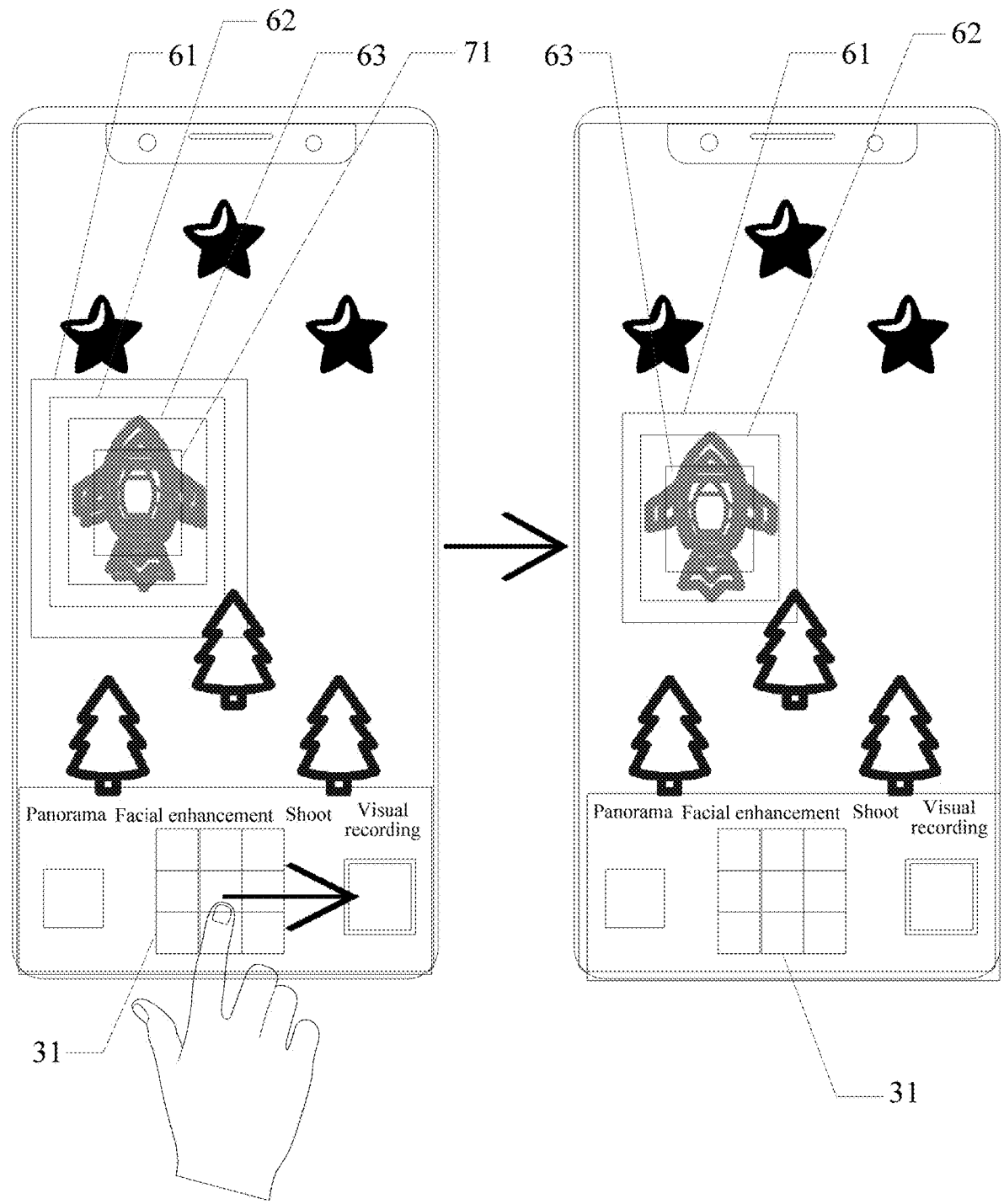
FIG. 9 is an eighth interface diagram of a photographing preview interface in a photographing method according to an embodiment of this application.

Alternatively, then, as shown on the left side in FIG. 9, it is assumed that the user performs sliding on any control region of the target control 31 on the photographing preview interface shown on the right side in FIG. 7, that is, a display region of any grid in a 3×3 pattern shown on the left side in FIG. 9 by using a touch apparatus such as a finger or a stylus, and a sliding direction is rightward. As shown on the right side in FIG. 9, the most recent operation is cancelled, that is, the operation in which "one image 71 of the rocket is superposed on the three images 61 to 63 of the rocket that are superposed and displayed on the photographing preview interface and is displayed" is cancelled.

After the M first images are displayed on the photographing preview interface, the sliding input performed by the user on the target control can be received, and in a case that the sliding direction of the sliding input is the first direction, the image that is of the first object and that is collected by the first camera is displayed on the photographing preview interface, where the first camera is any camera in the N cameras except the M cameras, and the N cameras are in a one-to-one correspondence with the N control regions, so that after the user displays the M first images on the photographing preview interface, the user can further quickly and conveniently add, to the photographing preview interface, an image that is of the first object and that is collected by any camera except the M cameras. Therefore, photographing of an image that meets a desired effect of the user can be simplified. In addition, the user can flexibly use each camera, thereby meeting photographing requirements of different users for different photographing effects.

After the M first images are displayed on the photographing preview interface, the sliding input on the target control can be received, and in a case that the sliding direction of the sliding input is the second direction, display, on the photographing preview interface, of the image that is of the first object and that is collected by the second camera is cancelled, where the second camera is any camera in the M cameras, so that after the user displays the M first images on the photographing preview interface, one or more first images in the M first images can be quickly and conveniently deleted as required. Therefore, photographing of an image that meets a desired effect of the user can be simplified. In addition, the user can flexibly use each camera, thereby meeting photographing requirements of different users for different photographing effects.

After the M first images are displayed on the photographing preview interface, the sliding input on the target control can be received, and in a case that the sliding direction of the sliding input is the third direction, the first operation can be cancelled, where the first execution moment of the first operation is earlier than the second execution moment of the sliding input, so that after the M first images are displayed on the photographing preview interface, the user can further quickly and conveniently cancel the previous operation. Therefore, photographing of an image that meets a desired effect of the user can be simplified. In addition, the user can flexibly use each camera, thereby meeting photographing requirements of different users for different photographing effects.

Optionally, in a case that the sliding direction of the sliding input is the first direction, the first camera is a camera corresponding to a first target control region in the N control regions, and the first target control region is a control region closest to a start input location of the sliding input; and in a case that the sliding direction of the sliding input is the second direction, the second camera is a camera corresponding to a second target control region in the N control regions, and the second target control region is a control region closest to the start input location of the sliding input.

In this embodiment of this application, in a case that the sliding direction of the sliding input is the first direction, when the start input location of the sliding input is located in one control region in the N control regions, and a camera corresponding to the control region in which the start input location of the sliding input is located is a camera in the N cameras except the M cameras, the first target control region may be the control region in which the start input location of the sliding input is located; or when the start input location of the sliding input is located in one control region in the N control regions, and a camera corresponding to the control region in which the start input location of the sliding input is located is a camera in the M cameras, the first target control region may be a control region closest to the start input location of the sliding input other than the control region in which the start input location of the sliding input is located.

Likewise, in a case that the sliding direction of the sliding input is the second direction, when the start input location of the sliding input is located in one control region in the N control regions, and a camera corresponding to the control region in which the start input location of the sliding input is located is a camera in the N cameras except the M cameras, the second target control region may be the control region in which the start input location of the sliding input is located; or when the start input location of the sliding input is located in one control region in the N control regions, and a camera corresponding to the control region in which the start input location of the sliding input is located is a camera in the M cameras, the second target control region may be a control region closest to the start input location of the sliding input other than the control region in which the start input location of the sliding input is located.

In a case that the sliding direction of the sliding input is the first direction, the first camera is a camera corresponding to the first target control region in the N control regions, and the first target control region is a control region closest to the start input location of the sliding input, so that the user can conveniently select a camera corresponding to an image that needs to be added by controlling the start input location of the sliding input. Therefore, photographing of an image that meets a desired effect of the user can be simplified. In addition, the user can flexibly use each camera, thereby meeting photographing requirements of different users for different photographing effects.

In a case that the sliding direction of the sliding input is the second direction, the second camera is a camera corresponding to the second target control region in the N control regions, and the second target control region is a control region closest to the start input location of the sliding input, so that the user can conveniently select a camera corresponding to an image that needs to be selected by controlling the start input location of the sliding input. Therefore, photographing of an image that meets a desired effect of the user can be simplified. In addition, the user can flexibly use each camera, thereby meeting photographing requirements of different users for different photographing effects.

In addition, it should be noted that in some other implementations of this embodiment, the first target control region may be a control region closest to an end input location of the sliding input, and the second target control region may also be a control region closest to the end input location of the sliding input.

Optionally, after the displaying M first images on a photographing preview interface in response to the first input, the method further includes:

receiving a second input performed by the user on the target control and a third input performed by the user to select a target image on the photographing preview interface, where the second input is used to trigger execution of a replication operation, and the target image is an image of a second object; and replicating, in response to the second input and the third input, all operations performed on the first object to the second object, where after all the operations performed on the first object are replicated to the second object, M second images are displayed on the photographing preview interface, and the M second images are images of the second object that are respectively collected by the M cameras.

In this embodiment of this application, the second input may be a tap input, for example, touch inputs or operations of various types such as a single-tap input or a double-tap input, a sliding input, a circle input, a long-press input, or a double-finger sliding input, or may be a sound input. The third input may be a click input, for example, a single-click input or a double-click input, a sliding input, a circle input, or a long-press input, or may be a sound input.

The second object may be an object corresponding to any image except the image of the first object on the photographing preview interface. For example, when an image of a star, an image of a rocket, and an image of a tree are displayed on the photographing preview interface, and the first object is the rocket, the second object may be the star or the tree.

An input time of the second input may be earlier than an input time of the third input, or an input time of the second input may be later than an input time of the third input, or an input time of the second input may be the same as an input time of the third input. This is not limited in this embodiment of this application.

The replicating all operations performed on the first object to the second object may be understood as: performing a same historical operation on the image of the second object as the image of the first object. For example, assuming that the user successively superposes, through an operation, an image of the star collected by a camera A, an image of the star collected by a camera B, and an image of the star collected by a camera C to be displayed on the photographing preview interface, and the second object is the tree, the replicating all operations performed on the first object to the second object may be understood as: successively superposing and displaying, on the photographing preview interface on which the image of the star collected by the camera A, the image of the star collected by the camera B, and the image of the star collected by the camera C are successively superposed and displayed, an image of the tree collected by the camera A, an image of the tree collected by the camera B, and an image of the tree collected by the camera C.

For ease of understanding, the foregoing examples, that is, the examples corresponding to FIG. 2 to FIG. 4, are still described herein. It is assumed that in step 3 of the foregoing example, after the user performs sliding on the display region of the 3×3 pattern, that is, the target control 31 by using a touch apparatus such as a finger or a stylus, and the sliding track passes through any three control regions in the target control 31, the photographing preview interface is shown on the right side in FIG. 6, that is, display areas of three display images 61 to 63 of the rocket are different from each other, and the three images 61 to 63 of the rocket are successively superposed and displayed. Before step 4 of the foregoing example after step 3, as shown on the left side in FIG. 10, if the user performs an upward sliding operation on the target control 31 by using two fingers, that is, a display region of a 3×3 pattern shown on the left side in FIG. 10, and circles an image 24 of the tree on the photographing preview interface by using the fingers, all operations performed on the selected "rocket" in step 2 of the foregoing example are triggered to be replicated to the selected "tree". As shown on the right side in FIG. 10, after all operations performed on the selected "rocket" in step 2 of the foregoing example are replicated to the selected "tree", three images 81 to 83 of the tree are displayed on the photographing preview interface, and the three images 81 to 83 of the tree are respectively collected by three cameras corresponding to the three images 61 to 63 of the rocket displayed on the photographing preview interface. It can be learned that, that all operations performed on the selected "rocket" in step 2 of the foregoing example are replicated to the selected "tree" is actually adding an image of the "tree" collected by a camera corresponding to each control region in the three control regions through which the sliding track in step 3 of the foregoing example passes to the photographing preview interface.

After the displaying M first images on a photographing preview interface, the method further includes: receiving a second input performed by the user on the target control and a third input performed by the user to select a target image on the photographing preview interface, where the second input is used to trigger execution of a replication operation, and the target image is an image of a second object; and replicating, in response to the second input and the third input, all operations performed on the first object to the second object, where after all the operations performed on the first object are replicated to the second object, M second images are displayed on the photographing preview interface, and the M second images are images of the second object that are respectively collected by the M cameras. Therefore, the user only needs to select the image of the second object and perform the second input on the target control, so that all operations performed on the first object can be replicated to the second object. In this way, when the user needs to perform the same operation on another object as a processed object, operations of the user can be more convenient and efficient. Therefore, photographing of an image that meets a desired effect of the user can be simplified. In addition, the user can flexibly use each camera, thereby meeting photographing requirements of different users for different photographing effects.

Optionally, the second input is further used to instruct to establish an association relationship;
the replicating, in response to the second input and the third input, all operations performed on the first object to the second object includes:
replicating, in response to the second input and the third input, all the operations performed on the first object to the second object, and establishing an association relationship between the first object and the second object; and
after the replicating, in response to the second input and the third input, all the operations performed on the first object to the second object, and establishing an association relationship between the first object and the second object, the method further includes:
receiving a fourth input on the target control; and
separately performing the same processing on an image of the first object and an image of the second object in response to the fourth input.

In this embodiment of this application, after the association relationship between the first object and the second object is established, when the user performs an operation on either of the first object and the second object, the same operation is triggered on the other object. For example, it is assumed that after the association relationship between the first object and the second object is established, if the user adds, to the photographing preview interface by operating the target control, an image that is of the first object and that is collected by a camera D, an image that is of the second object and that is collected by the camera D is also added to the photographing preview interface.

The fourth input may be a tap input, for example, touch operations of various types such as a single-tap input or a double-tap input, a sliding input, a circle input, or a long-press input. The sixth input may be a tap, for example, touch operations of various types such as a single tap or a double tap, sliding, circling, or long-pressing.

Figure 10:
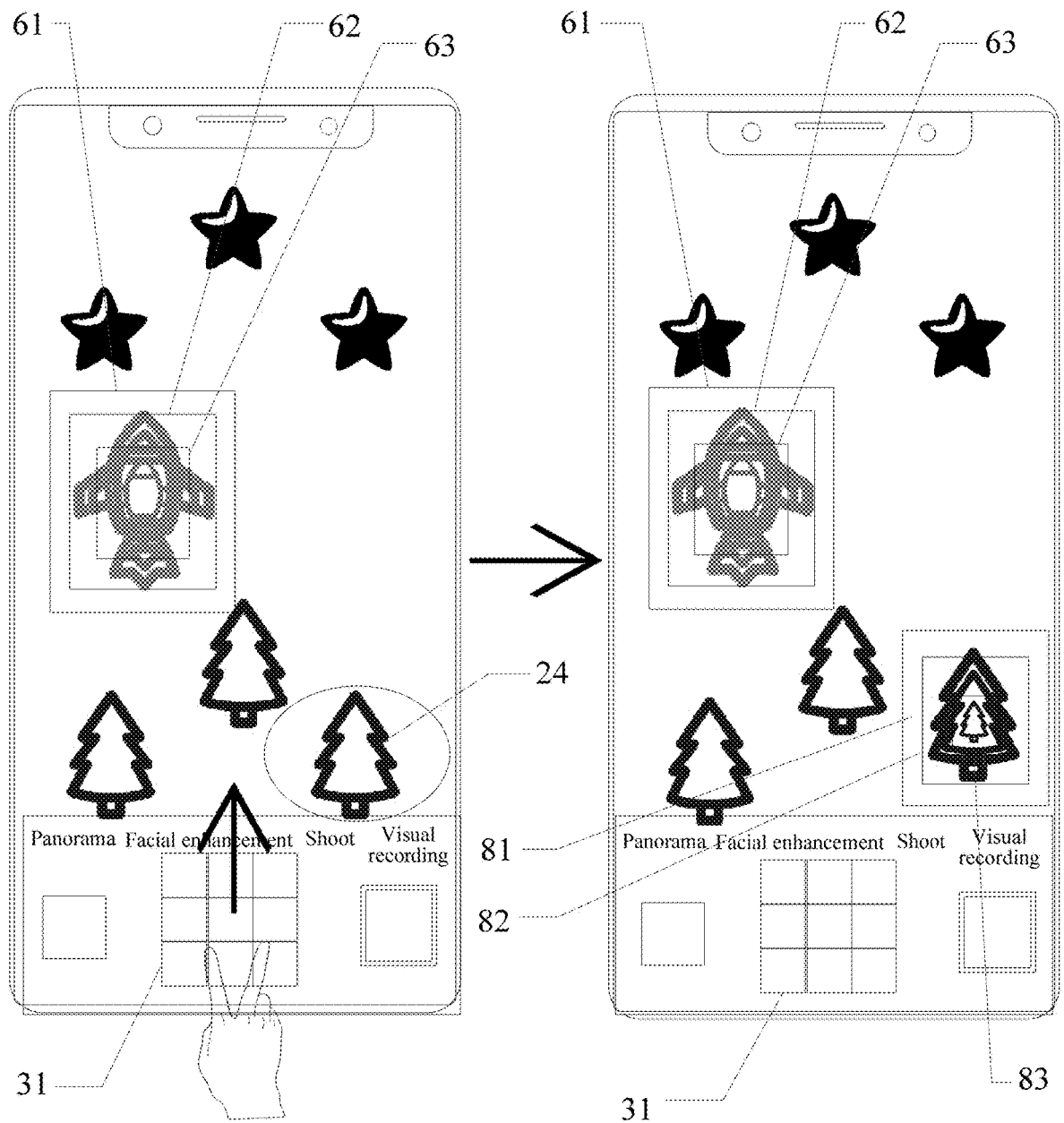
FIG. 10 is a ninth interface diagram of a photographing preview interface in a photographing method according to an embodiment of this application.

For ease of understanding, details are described herein based on the example in the previous implementation, that is, the example corresponding to FIG. 10. For example, in the example in the previous implementation, when all operations performed on the selected "rocket" in step 2 of the foregoing example are triggered to be replicated to the selected "tree", an association relationship between the tree and the rocket may be further triggered to be established. After the association relationship is established between the tree and the rocket, if the user performs an operation on either of the rocket and the tree on the photographing preview interface, the same operation is replicated to the other, that is, after the association relationship is established between the tree and the rocket, operations of the two are synchronized.

The association relationship between the first object and the second object is established during replication, so that the user can subsequently synchronize operations on the first object and the second object. In this way, a batch operation is performed, and operation efficiency is improved. Therefore, photographing of an image that meets a desired effect of the user can be further simplified.

Optionally, after the replicating, in response to the second input and the third input, all the operations performed on the first object to the second object, and establishing an association relationship between the first object and the second object, the method further includes:

receiving a fifth input performed by the user on the target control; and unbinding the association relationship in response to the fifth input.

In this embodiment of this application, the fifth input may be a tap input, for example, touch inputs or operations of various types such as a single-tap input or a double-tap input, a sliding input, a circle input, a long-press input, or a double-finger sliding input. The unbinding the association relationship may be understood as: operations of the first object and the second object are not synchronized, and the user may separately perform different operations on the first object and the second object.

Figure 11:
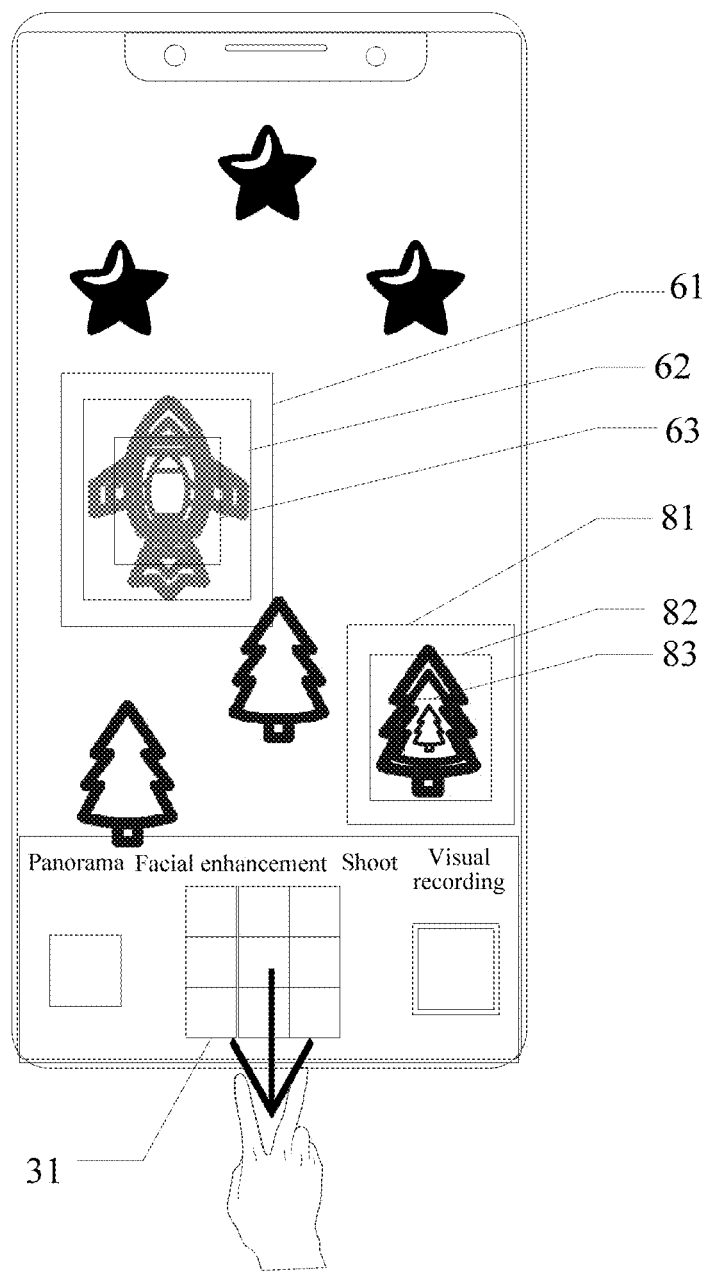
FIG. 11 is a tenth interface diagram of a photographing preview interface in a photographing method according to an embodiment of this application.

For ease of understanding, details are described herein based on the example in the previous implementation. It is assumed that after the association relationship between the tree and the rocket is triggered to be established, as shown in FIG. 11, if the user performs sliding on the target control 31 by using two fingers, that is, a display region of a 3×3 pattern shown in FIG. 11, and a sliding direction is downward, the association relationship between the tree and the rocket is unbound, but a previous replication operation is not cancelled. After the association relationship between the tree and the rocket is unbound, when the user performs an operation on one of the tree and the rocket on the photographing preview interface, the operation is not replicated to the other, that is, operations of the two are not synchronized after the association relationship between the tree and the rocket is unbound.

After the association relationship between the first object and the second object is established, the fifth input performed by the user on the target control may be further received, and the association relationship is unbound in response to the fifth input, so that the user can unbind the association relationship between the first object and the second object as required. In this way, differentiated operations can be performed on the first object and the second object. Therefore, photographing of an image that meets a desired effect of the user can be simplified. In addition, the user can flexibly use each camera, thereby meeting photographing requirements of different users for different photographing effects.

In this embodiment of this application, another method for performing hierarchical photographing on a plurality of objects is provided, to meet requirements of the user for using a mobile phone in more scenarios.

For example, in this embodiment of this application, an image that is of an object collected by each camera in all cameras and that is selected by a user can be added to a photographing preview interface, so that the user can obtain a hierarchical image by operating a target control in a photographing phase without performing later editing by using professional editing software after image photographing. Therefore, photographing of an image that meets a desired effect of the user can be simplified. In addition, the user can flexibly use each camera, thereby meeting photographing requirements of different users for different photographing effects.

It should be noted that the photographing method provided in the embodiments of this application may be performed by a photographing apparatus, or a control module that is in the photographing apparatus and that is configured to perform the photographing method. In the embodiments of this application, an example in which the photographing apparatus performs the photographing method is used to describe the photographing apparatus provided in the embodiments of this application.

Figure 12:
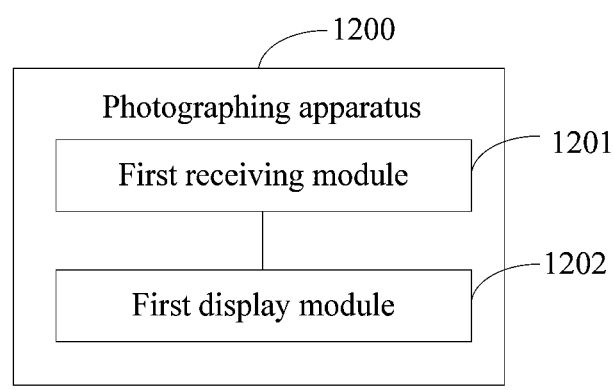
FIG. 12 is a structural diagram of a photographing apparatus according to an embodiment of this application.

As shown in FIG. 12, an embodiment of this application provides a photographing apparatus 1200, including:

a first receiving module 1201, configured to receive a first input performed by a user on M control regions of a target control, where the target control includes N control regions, the N control regions include the M control regions, M is a positive integer, and N is a positive integer greater than or equal to M; and a first display module 1202, configured to display M first images on a photographing preview interface in response to the first input, where the M first images are images of a first object that are respectively collected by M cameras, and the M cameras are in a one-to-one correspondence with the M control regions.

Optionally, a relative location between the M first images is determined according to a relative location between the M control regions.

Optionally, display areas of all of the M first images are different from each other, and the M first images are successively superposed and displayed.

Optionally, the first input is an input used for successively selecting the M control regions; and a superposition order of each first image in the M first images is determined according to a selected order of a control region corresponding to each first image, and a display area of each first image in the M first images is determined according to the selected order of the control region corresponding to each first image.

Optionally, the apparatus 1200 further includes:

a second receiving module, configured to receive a sliding input performed by the user on the target control; and a second display module, configured to:

in a case that a sliding direction of the sliding input is a first direction, display, on the photographing preview interface, an image that is of the first object and that is collected by a first camera, where the first camera is any camera in the N cameras except the M cameras, and the N cameras are in a one-to-one correspondence with the N control regions;

in a case that the sliding direction of the sliding input is a second direction, cancel display, on the photographing preview interface, of an image that is of the first object and that is collected by a second camera, where the second camera is any camera in the M cameras; and in a case that the sliding direction of the sliding input is a third direction, undo a first operation, where a first execution moment of the first operation is earlier than a second execution moment of the sliding input.

Optionally, in a case that the sliding direction of the sliding input is the first direction, the first camera is a camera corresponding to a first target control region in the N control regions, and the first target control region is a control region closest to a start input location of the sliding input; and in a case that the sliding direction of the sliding input is the second direction, the second camera is a camera corresponding to a second target control region in the N control regions, and the second target control region is a control region closest to the start input location of the sliding input.

Optionally, the apparatus 1200 further includes:

a third receiving module, configured to receive a second input performed by the user on the target control and a third input performed by the user to select a target image on the photographing preview interface, where the second input is used to trigger execution of a replication operation, and the target image is an image of a second object; and a replication module, configured to replicate, in response to the second input and the third input, all operations performed on the first object to the second object, where after all the operations performed on the first object are replicated to the second object, M second images are displayed on the photographing preview interface, and the M second images are images of the second object that are respectively collected by the M cameras.

Optionally, the second input is further used to instruct to establish an association relationship;

the replication module is configured to: replicate, in response to the second input and the third input, all the operations performed on the first object to the second object, and establish an association relationship between the first object and the second object; and the apparatus 1200 further includes:

a fourth receiving module, configured to receive a fourth input on the target control; and an execution module, configured to separately perform the same processing on an image of the first object and an image of the second object in response to the fourth input.

Optionally, the apparatus 1200 further includes:

a fifth receiving module, configured to receive a fifth input performed by the user on the target control; and an unbinding module, configured to unbind the association relationship in response to the fifth input.

According to the photographing apparatus in this embodiment of this application, an image that is of an object collected by each camera in all cameras and that is selected by a user can be added to a photographing preview interface, so that the user can obtain a hierarchical image by operating a target control in a photographing phase without performing later editing by using professional editing software after image photographing. Therefore, photographing of an image that meets a desired effect of the user can be simplified. In addition, the user can flexibly use each camera, thereby meeting photographing requirements of different users for different photographing effects.

The photographing apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, an in-vehicle electronic device, a wearable device, an ultra-mobile personal computer (UMPC), a netbook, or a personal digital assistant (PDA), and the non-mobile electronic device may be a personal computer (PC), a television (TV), an automated teller machine, or a self-service machine. This is not specifically limited in this embodiment of this application.

The photographing apparatus in this embodiment of this application may be an apparatus with an operating system. The operating system may be an Android (Android) operating system, an iOS operating system, or another possible operating system. This is not specifically limited in the embodiments of this application.

The photographing apparatus provided in this embodiment of this application can implement the processes implemented in the corresponding method embodiment in FIG. 1. To avoid repetition, details are not described herein again.

Figure 13:
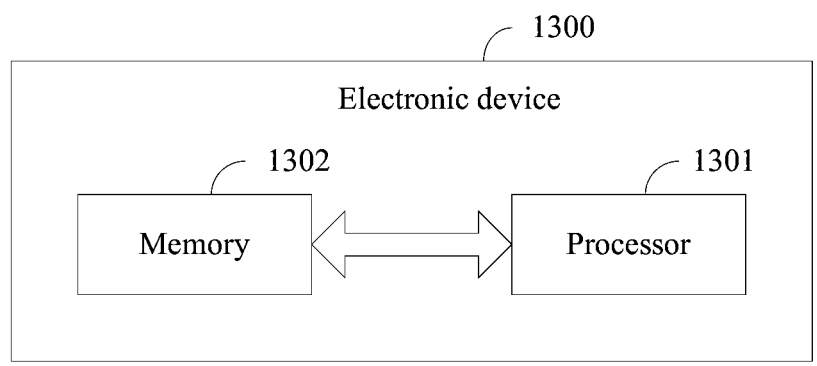
FIG. 13 is a structural diagram of an electronic device according to an embodiment of this application.

Optionally, as shown in FIG. 13, an embodiment of this application further provides an electronic device 1300, including a processor 1301, a memory 1302, and a program or an instruction stored in the memory 1302 and executable on the processor 1301. When the program or the instruction is executed by the processor 1301, the processes of the foregoing photographing method embodiment are implemented and a same technical effect can be achieved. To avoid repetition, details are not described herein again.

It should be noted that the electronic device in this embodiment of this application includes the foregoing mobile electronic device and the foregoing non-mobile electronic device.

Figure 14:
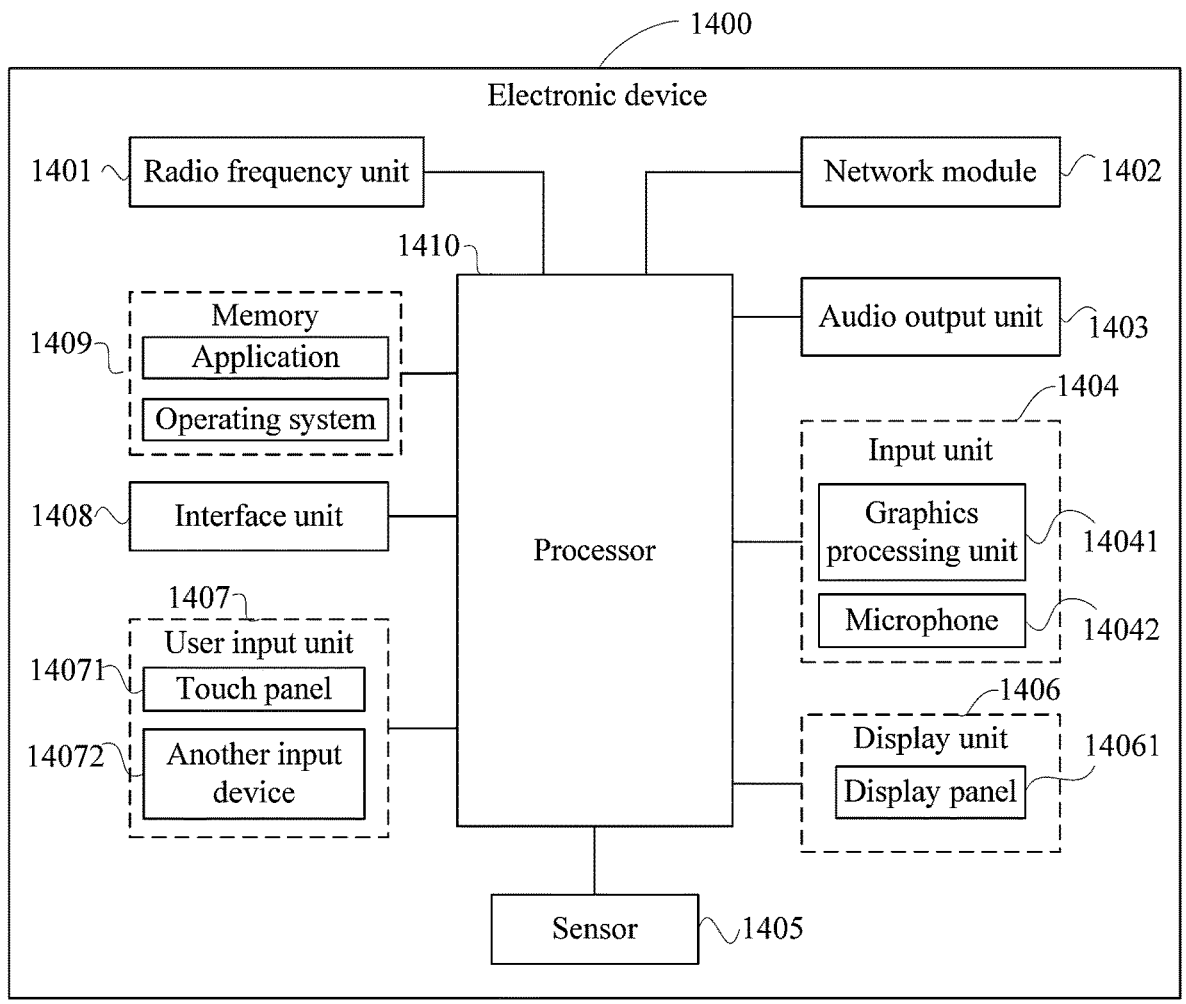
FIG. 14 is a structural diagram of another electronic device according to an embodiment of this application.

FIG. 14 is a schematic structural diagram of hardware of an electronic device according to an embodiment of this application. An electronic device 1400 includes but is not limited to components such as a radio frequency unit 1401, a network module 1402, an audio output unit 1403, an input unit 1404, a sensor 1405, a display unit 1406, a user input unit 1407, an interface unit 1408, a memory 1409, and a processor 1410.

A person skilled in the art can understand that the electronic device 1400 may further include a power supply (such as a battery) that supplies power to each component. The power supply may be logically connected to the processor 1410 by using a power supply management system, to implement functions such as charging and discharging management, and power consumption management by using the power supply management system. The structure of the electronic device shown in FIG. 14 does not constitute a limitation on the electronic device. The electronic device may include components more or fewer than those shown in the diagram, a combination of some components, or different component arrangements. Details are not described herein.

The user input unit 1407 is configured to receive a first input performed by a user on M control regions of a target control, where the target control includes N control regions, the N control regions include the M control regions, M is a positive integer, and N is a positive integer greater than or equal to M; and the display unit 1406 is configured to display M first images on a photographing preview interface in response to the first input, where the M first images are images of a first object that are respectively collected by M cameras, and the M cameras are in a one-to-one correspondence with the M control regions.

According to the electronic device in this embodiment of this application, an image that is of an object collected by each camera in all cameras and that is selected by a user can be added to a photographing preview interface, so that the user can obtain a hierarchical image by operating a target control in a photographing phase without performing later editing by using professional editing software after image photographing. Therefore, photographing of an image that meets a desired effect of the user can be simplified. In addition, the user can flexibly use each camera, thereby meeting photographing requirements of different users for different photographing effects.

Optionally, a relative location between the M first images is determined according to a relative location between the M control regions.

Optionally, display areas of all of the M first images are different from each other, and the M first images are successively superposed and displayed.

Optionally, the first input is an input used for successively selecting the M control regions; and a superposition order of each first image in the M first images is determined according to a selected order of a control region corresponding to each first image, and a display area of each first image in the M first images is determined according to the selected order of the control region corresponding to each first image.

Optionally, the user input unit 1407 is further configured to receive a sliding input performed by the user on the target control; and the display unit 1406 is further configured to:

in a case that a sliding direction of the sliding input is a first direction, display, on the photographing preview interface, an image that is of the first object and that is collected by a first camera, where the first camera is any camera in the N cameras except the M cameras, and the N cameras are in a one-to-one correspondence with the N control regions;

in a case that the sliding direction of the sliding input is a second direction, cancel display, on the photographing preview interface, of an image that is of the first object and that is collected by a second camera, where the second camera is any camera in the M cameras; and in a case that the sliding direction of the sliding input is a third direction, undo a first operation, where a first execution moment of the first operation is earlier than a second execution moment of the sliding input.

Optionally, in a case that the sliding direction of the sliding input is the first direction, the first camera is a camera corresponding to a first target control region in the N control regions, and the first target control region is a control region closest to a start input location of the sliding input; and in a case that the sliding direction of the sliding input is the second direction, the second camera is a camera corresponding to a second target control region in the N control regions, and the second target control region is a control region closest to the start input location of the sliding input.

Optionally, the user input unit 1407 is further configured to receive a second input performed by the user on the target control and a third input performed by the user to select a target image on the photographing preview interface, where the second input is used to trigger execution of a replication operation, and the target image is an image of a second object; and the display unit 1406 is further configured to replicate, in response to the second input and the third input, all operations performed on the first object to the second object, where after all the operations performed on the first object are replicated to the second object, M second images are displayed on the photographing preview interface, and the M second images are images of the second object that are respectively collected by the M cameras.

Optionally, the second input is further used to instruct to establish an association relationship;

the display unit 1406 is further configured to replicate, in response to the second input and the third input, all operations performed on the first object to the second object;

the processor 1410 is configured to establish an association relationship between the first object and the second object;

the user input unit 1407 is further configured to receive a fourth input on the target control; and the processor 1410 is further configured to separately perform the same processing on an image of the first object and an image of the second object in response to the fourth input.

Optionally, the user input unit 1407 is further configured to receive a fifth input performed by the user on the target control; and the processor 1410 is configured to s unbind the association relationship in response to the fifth input.

According to the electronic device in this embodiment of this application, an image that is of an object collected by each camera in all cameras and that is selected by a user can be added to a photographing preview interface, so that the user can obtain a hierarchical image by operating a target control in a photographing phase without performing later editing by using professional editing software after image photographing. Therefore, photographing of an image that meets a desired effect of the user can be simplified. In addition, the user can flexibly use each camera, thereby meeting photographing requirements of different users for different photographing effects.

It should be understood that, in this embodiment of this application, the input unit 1404 may include a graphics processing unit (GPU) 14041 and a microphone 14042, and the graphics processing unit 14041 processes image data of a still picture or a video obtained by an image capture apparatus (such as a camera) in a video capture mode or an image capture mode. The display unit 1406 may include a display panel 14061. Optionally, the display panel 14061 may be configured in a form such as a liquid crystal display or an organic light-emitting diode. The user input unit 1407 includes a touch panel 14071 and another input device 14072. The touch panel 14071 is also referred to as a touchscreen. The touch panel 14071 may include two parts: a touch detection apparatus and a touch controller. The another input device 14072 may include but is not limited to a physical keyboard, a functional button (such as a volume control button or a power on/off button), a trackball, a mouse, and a joystick. Details are not described herein. The memory 1409 may be configured to store a software program and various data, including but not limited to an application and an operating system. An application processor and a modem processor may be integrated into the processor 1410, the application processor mainly processes an operating system, a user interface, an application, and the like, and the modem processor mainly processes wireless communication. It can be understood that, alternatively, the modem processor may not be integrated into the processor 1410.

An embodiment of this application further provides a non-transitory readable storage medium. The non-transitory readable storage medium stores a program or an instruction, and when the program or the instruction is executed by a processor, the processes of the foregoing photographing method embodiment are implemented and a same technical effect can be achieved. To avoid repetition, details are not described herein again.

The processor is a processor in the electronic device in the foregoing embodiment. The non-transitory readable storage medium includes a non-transitory computer-readable storage medium, such as a computer read-only memory (ROM), a random access memory (RAM), a magnetic disk, or an optical disc.

An embodiment of this application further provides a chip. The chip includes a processor and a communications interface, the communications interface is coupled to the processor, and the processor is configured to run a program or an instruction to implement the processes of the foregoing photographing method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

An embodiment of this application further provides a computer software product. The computer software product is stored in a non-volatile storage medium, and the computer software product is executed by at least one processor to implement the processes of the foregoing photographing method embodiment, and a same technical effect can be achieved. To avoid repetition, details are not described herein again.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a software product. The computer software product is stored in a non-transitory storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of this application.

A person of ordinary skill in the art may be aware that, in combination with the examples described in the embodiments disclosed in this specification, units and algorithm steps may be implemented by using electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present disclosure.

It can be clearly understood by a person skilled in the art that, for the purpose of convenient and brief description, for an operating process of the foregoing system, apparatus, and unit, refer to a corresponding process in the foregoing method embodiments. Details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions in the embodiments.

In addition, functional units in the embodiments of the present disclosure may be integrated into one processing unit, or each of the units may exist alone physically, or two or more units are integrated into one unit.

The embodiments of this application are described above with reference to the accompanying drawings, but this application is not limited to the above implementations, and the above implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. A photographing method, comprising:
receiving a first input performed by a user on M control regions of a target control, wherein the target control comprises N control regions, the N control regions comprise the M control regions, M is a positive integer, and N is a positive integer greater than or equal to M; and
displaying M first images on a photographing preview interface in response to the first input, wherein the M first images are images of a first object that are respectively collected by M cameras, and the M cameras are in a one-to-one correspondence with the M control regions; wherein display areas of all of the M first images are different from each other, and the M first images are successively superposed and displayed; wherein the first input is an input used for successively selecting the M control regions;

a superposition order of each first image in the M first images is determined according to a selected order of a control region corresponding to each first image, and a display area of each first image in the M first images is determined according to the selected order of the control region corresponding to each first image; and after the displaying M first images on a photographing preview interface in response to the first input, the method further comprises:

receiving a sliding input performed by the user on the target control;

in a case that a sliding direction of the sliding input is a first direction, displaying, on the photographing preview interface, an image that is of the first object and that is collected by a first camera, wherein the first camera is any camera in N cameras except the M cameras, and the N cameras are in a one-to-one correspondence with the N control regions;

in a case that the sliding direction of the sliding input is a second direction, cancelling display, on the photographing preview interface, of an image that is of the first object and that is collected by a second camera, wherein the second camera is any camera in the M cameras; and in a case that the sliding direction of the sliding input is a third direction, undoing a first operation, wherein a first execution moment of the first operation is earlier than a second execution moment of the sliding input.

2. The method according to claim 1, wherein in a case that the sliding direction of the sliding input is the first direction, the first camera is a camera corresponding to a first target control region in the N control regions, and the first target control region is a control region closest to a start input location of the sliding input; and in a case that the sliding direction of the sliding input is the second direction, the second camera is a camera corresponding to a second target control region in the N control regions, and the second target control region is a control region closest to the start input location of the sliding input.

3. The method according to claim 1, wherein after the displaying M first images on a photographing preview interface in response to the first input, the method further comprises:

receiving a second input performed by the user on the target control and a third input performed by the user to select a target image on the photographing preview interface, wherein the second input is used to trigger execution of a replication operation, and the target image is an image of a second object; and replicating, in response to the second input and the third input, all operations performed on the first object to the second object, wherein after all the operations performed on the first object are replicated to the second object, M second images are displayed on the photographing preview interface, and the M second images are images of the second object that are respectively collected by the M cameras.

4. The method according to claim 3, wherein the second input is further used to instruct to establish an association relationship;

the replicating, in response to the second input and the third input, all operations performed on the first object to the second object comprises:

replicating, in response to the second input and the third input, all the operations performed on the first object to the second object, and establishing an association relationship between the first object and the second object; and after the replicating, in response to the second input and the third input, all the operations performed on the first object to the second object, and establishing an association relationship between the first object and the second object, the method further comprises:

receiving a fourth input on the target control; and separately performing the same processing on an image of the first object and an image of the second object in response to the fourth input; wherein after the replicating, in response to the second input and the third input, all the operations performed on the first object to the second object, and establishing an association relationship between the first object and the second object, the method further comprises:

receiving a fifth input performed by the user on the target control; and unbinding the association relationship in response to the fifth input.

5. An electronic device, comprising a processor, a memory, and a program or an instruction stored in the memory and executable on the processor, wherein the program or the instruction, when executed by the processor, causes the electronic device to perform:

receiving a first input performed by a user on M control regions of a target control, wherein the target control comprises N control regions, the N control regions comprise the M control regions, M is a positive integer, and N is a positive integer greater than or equal to M; and displaying M first images on a photographing preview interface in response to the first input, wherein the M first images are images of a first object that are respectively collected by M cameras, and the M cameras are in a one-to-one correspondence with the M control regions; wherein display areas of all of the M first images are different from each other, and the M first images are successively superposed and displayed; wherein the first input is an input used for successively selecting the M control regions;

a superposition order of each first image in the M first images is determined according to a selected order of a control region corresponding to each first image, and a display area of each first image in the M first images is determined according to the selected order of the control region corresponding to each first image; and the program or the instruction, when executed by the processor, causes the electronic device to further perform:

receiving a sliding input performed by the user on the target control;

in a case that a sliding direction of the sliding input is a first direction, displaying, on the photographing preview interface, an image that is of the first object and that is collected by a first camera, wherein the first camera is any camera in N cameras except the M cameras, and the N cameras are in a one-to-one correspondence with the N control regions;

in a case that the sliding direction of the sliding input is a second direction, cancelling display, on the photographing preview interface, of an image that is of the first object and that is collected by a second camera, wherein the second camera is any camera in the M cameras; and in a case that the sliding direction of the sliding input is a third direction, undoing a first operation, wherein a first execution moment of the first operation is earlier than a second execution moment of the sliding input.

6. The electronic device according to claim 5, wherein in a case that the sliding direction of the sliding input is the first direction, the first camera is a camera corresponding to a first target control region in the N control regions, and the first target control region is a control region closest to a start input location of the sliding input; and in a case that the sliding direction of the sliding input is the second direction, the second camera is a camera corresponding to a second target control region in the N control regions, and the second target control region is a control region closest to the start input location of the sliding input.

7. The electronic device according to claim 5, wherein the program or the instruction, when executed by the processor, causes the electronic device to further perform:

receiving a second input performed by the user on the target control and a third input performed by the user to select a target image on the photographing preview interface, wherein the second input is used to trigger execution of a replication operation, and the target image is an image of a second object; and replicating, in response to the second input and the third input, all operations performed on the first object to the second object, wherein after all the operations performed on the first object are replicated to the second object, M second images are displayed on the photographing preview interface, and the M second images are images of the second object that are respectively collected by the M cameras.

8. The electronic device according to claim 7, wherein the second input is further used to instruct to establish an association relationship; and the program or the instruction, when executed by the processor, causes the electronic device to perform:

replicating, in response to the second input and the third input, all the operations performed on the first object to the second object, and establishing an association relationship between the first object and the second object; and the program or the instruction, when executed by the processor, causes the electronic device to further perform:

receiving a fourth input on the target control; and separately performing the same processing on an image of the first object and an image of the second object in response to the fourth input; and the program or the instruction, when executed by the processor, causes the electronic device to further perform:

receiving a fifth input performed by the user on the target control; and unbinding the association relationship in response to the fifth input.

9. A non-transitory readable storage medium, wherein the non-transitory readable storage medium stores a program or instruction, and the program or the instruction, when executed by a processor of an electronic device, causes the electronic device to perform:

receiving a first input performed by a user on M control regions of a target control, wherein the target control comprises N control regions, the N control regions comprise the M control regions, M is a positive integer, and N is a positive integer greater than or equal to M; and displaying M first images on a photographing preview interface in response to the first input, wherein the M first images are images of a first object that are respectively collected by M cameras, and the M cameras are in a one-to-one correspondence with the M control regions; wherein display areas of all of the M first images are different from each other, and the M first images are successively superposed and displayed; wherein the first input is an input used for successively selecting the M control regions;

a superposition order of each first image in the M first images is determined according to a selected order of a control region corresponding to each first image, and a display area of each first image in the M first images is determined according to the selected order of the control region corresponding to each first image; and the program or the instruction, when executed by the processor, causes the electronic device to further perform:

receiving a sliding input performed by the user on the target control;

in a case that a sliding direction of the sliding input is a first direction, displaying, on the photographing preview interface, an image that is of the first object and that is collected by a first camera, wherein the first camera is any camera in N cameras except the M cameras, and the N cameras are in a one-to-one correspondence with the N control regions;

in a case that the sliding direction of the sliding input is a second direction, cancelling display, on the photographing preview interface, of an image that is of the first object and that is collected by a second camera, wherein the second camera is any camera in the M cameras; and in a case that the sliding direction of the sliding input is a third direction, undoing a first operation, wherein a first execution moment of the first operation is earlier than a second execution moment of the sliding input.

10. The non-transitory readable storage medium according to claim 9, wherein in a case that the sliding direction of the sliding input is the first direction, the first camera is a camera corresponding to a first target control region in the N control regions, and the first target control region is a control region closest to a start input location of the sliding input; and in a case that the sliding direction of the sliding input is the second direction, the second camera is a camera corresponding to a second target control region in the N control regions, and the second target control region is a control region closest to the start input location of the sliding input.

11. The non-transitory readable storage medium according to claim 9, wherein the program or the instruction, when executed by the processor, causes the electronic device to further perform:

receiving a second input performed by the user on the target control and a third input performed by the user to select a target image on the photographing preview interface, wherein the second input is used to trigger execution of a replication operation, and the target image is an image of a second object; and replicating, in response to the second input and the third input, all operations performed on the first object to the second object, wherein after all the operations performed on the first object are replicated to the second object, M second images are displayed on the photographing preview interface, and the M second images are images of the second object that are respectively collected by the M cameras.

* * * * *